United States Patent [19]

Levinson

[11] Patent Number: 5,271,079
[45] Date of Patent: Dec. 14, 1993

[54] LIGHT MIXING DEVICE WITH FIBER OPTIC OUTPUT

[75] Inventor: Frank H. Levinson, Palo Alto, Calif.

[73] Assignee: Finisar Corporation, Menlo Park, Calif.

[21] Appl. No.: 789,586

[22] Filed: Nov. 8, 1991

[51] Int. Cl.$^5$ ............................................. G02B 6/42
[52] U.S. Cl. ...................................... 385/46; 385/43; 385/92
[58] Field of Search ..................... 385/46, 24, 54, 56, 385/43, 51, 88, 92; 359/109, 120, 618; 375/1; 250/228

[56] References Cited

U.S. PATENT DOCUMENTS

| | | | |
|---|---|---|---|
| 3,756,688 | 9/1973 | Hudson et al. | 385/43 |
| 3,874,781 | 4/1975 | Thiel | 385/46 |
| 4,198,118 | 4/1980 | Porter | 350/96.16 |
| 4,305,641 | 12/1981 | Witte | 385/46 |
| 4,365,864 | 12/1982 | Cowley et al. | 385/46 |
| 4,449,783 | 5/1984 | Witte | 350/96.16 |
| 4,484,794 | 11/1984 | Witte | 350/96.16 |
| 4,653,845 | 3/1987 | Tremblay et al. | 350/96.16 |
| 4,730,891 | 3/1988 | Poorman | 385/54 X |
| 4,781,427 | 11/1988 | Husbands et al. | 350/96.16 |
| 4,822,128 | 4/1989 | Imoto et al. | 350/96.16 |
| 4,904,042 | 2/1990 | Dragone | 350/96.16 |
| 4,983,884 | 1/1991 | Wychulis | 315/151 |
| 4,995,692 | 2/1991 | Deliello et al. | 350/96.16 |
| 5,019,301 | 5/1991 | Coden et al. | 264/1.5 |
| 5,035,480 | 7/1991 | Dutt | 350/96.15 |

Primary Examiner—John D. Lee
Assistant Examiner—Phan Thi Heartney
Attorney, Agent, or Firm—Woodard, Emhardt, Naughton, Moriarty & McNett

[57] ABSTRACT

A light mixing device includes multiple light sources supplying light into a mixing rod. The mixing rod mixes the light and supplies it to a plurality of output optical fibers. The physical configuration of the mixing rod is such that light from the various light sources is coupled to each of the output fibers in such a fashion that the light carried by each of the fibers is relatively equal in intensity. The mixing rod structure is larger than the diameter of a single fiber to enable coupling light into multiple fibers. The illumination sources disclosed are narrow-band light emitting diodes wherein light having a narrow frequency range is produced by each LED. Multiple LEDs producing light in several distinct ranges are used.

10 Claims, 4 Drawing Sheets

LIGHT MIXING DEVICE WITH FIBER OPTIC OUTPUT

FIELD OF THE INVENTION

This invention relates in general to the field of fiber optic devices and more particularly to a device wherein light from multiple sources is evenly distributed into multiple output optical fibers.

BACKGROUND OF THE INVENTION

Star couplers are optical devices used in the field of fiber optics for mixing together a plurality of light signals from different optical fibers and supplying all of those signals to a plurality of output optical fibers. Several different star couplers are known. In general, the couplers have a plurality of incoming channels, a plurality of outgoing channels, and a mixing zone that couples optical signals from any one of the incoming channels to all of the outgoing light conveying devices or optical transmission devices. The mixing zone may be optic fibers tapered and fused together, or a waveguide-like solid block of glass or other transparent material. Transparent mixing blocks are typically clad with a material having a refractive index lower than that of the core material of the mixing blocks. The core is the central region of an optical transmission material.

In some applications, it is advantageous to have either the input or the output of a star coupler terminate onto an optoelectronic device such as a photo diode or light emitting diode (LED). One approach is to break a fused fiber bundle in the middle of the taper of the fused portion so that light may be coupled to and from this region onto a single optoelectronic device.

Planar and mixing rod structures are employed to perform the function of a star coupler mixing region. Optical fibers abut one end of the mixing rod or planar region so that light passing through the mixing rod is optically introduced into the optical fibers. The following U.S. Patents disclose various implementations of a mixing rod in an optical coupler device. U.S. Pat. No. 4,995,692 to Diliello et al., U.S. Pat. No. 4,198,118 to Porter, U.S. Pat. No. 4,653,845 to Tremblay et al. and U.S. Pat. No. 5,019,301 to Coden et al.

In certain applications, it is desirable to mix light from several different active sources, wherein each source produces light with a frequency content centered in a narrow range of frequencies. The mixing of light from several different sources is necessary or desired particularly in the field of spectroscopy, wherein light reflected from a target is analyzed to determine the percentage of light that is reflected by the target. Such devices are commonly referred to as reflectance meters. A compact device that efficiently and accurately combines the light from multiple light sources and that supplies the light to multiple optical fibers is needed for highly accurate spectroscopy devices. Examples of such devices are blood oxygen measuring devices and blood glucose measuring devices used by many diabetics.

SUMMARY OF THE INVENTION

A light mixing device according to one aspect of the present invention comprises a housing having a passage therethrough, a mixing rod having a first end and a second end, the rod situated within the passage, the mixing rod having a length at least a predetermined multiple of its diameter, a plurality of light generating devices attached to the housing and situated in close proximity to the first end of the rod, and a plurality of optical fibers attached to the housing and situated in close proximity to the second end of the rod, the fibers extending outward from the passage.

A fiber optic light mixing device according to another aspect of the present invention comprises a housing having a passage therethrough, light mixing means situated within the passage, the light mixing means including an input aperture and an output aperture, multiple light signal generating means attached to the housing and situated in close proximity to the input aperture for supplying light into the input aperture, and a plurality of optical fibers attached to the housing and situated in close proximity to the output aperture.

One object of the present invention is to provide an improved light mixing device.

Another object of the present invention is to provide an improved light mixing device that is substantially smaller than existing light mixing devices.

Another object of the present invention is to couple light more effectively on a per fiber basis, from multiple light sources to multiple optical targets, than could be coupled from a single light source to a single optical fiber.

Another object of the present invention is to provide a light coupling device that employs a mixing rod structure able to collect more of the light emitted from a light source and to supply that light to a plurality of optical fibers.

A further object of the present invention is to provide a light mixing device that evenly couples and distributes light from multiple light sources into several output optical fibers with a high degree of accuracy and precision, thereby creating uniformity in light intensity among the output fibers.

These and other objects of the present invention will become more apparent from the following description of the preferred embodiments.

DESCRIPTION OF THE PREFERRED EMBODIMENTS

Figure 1:
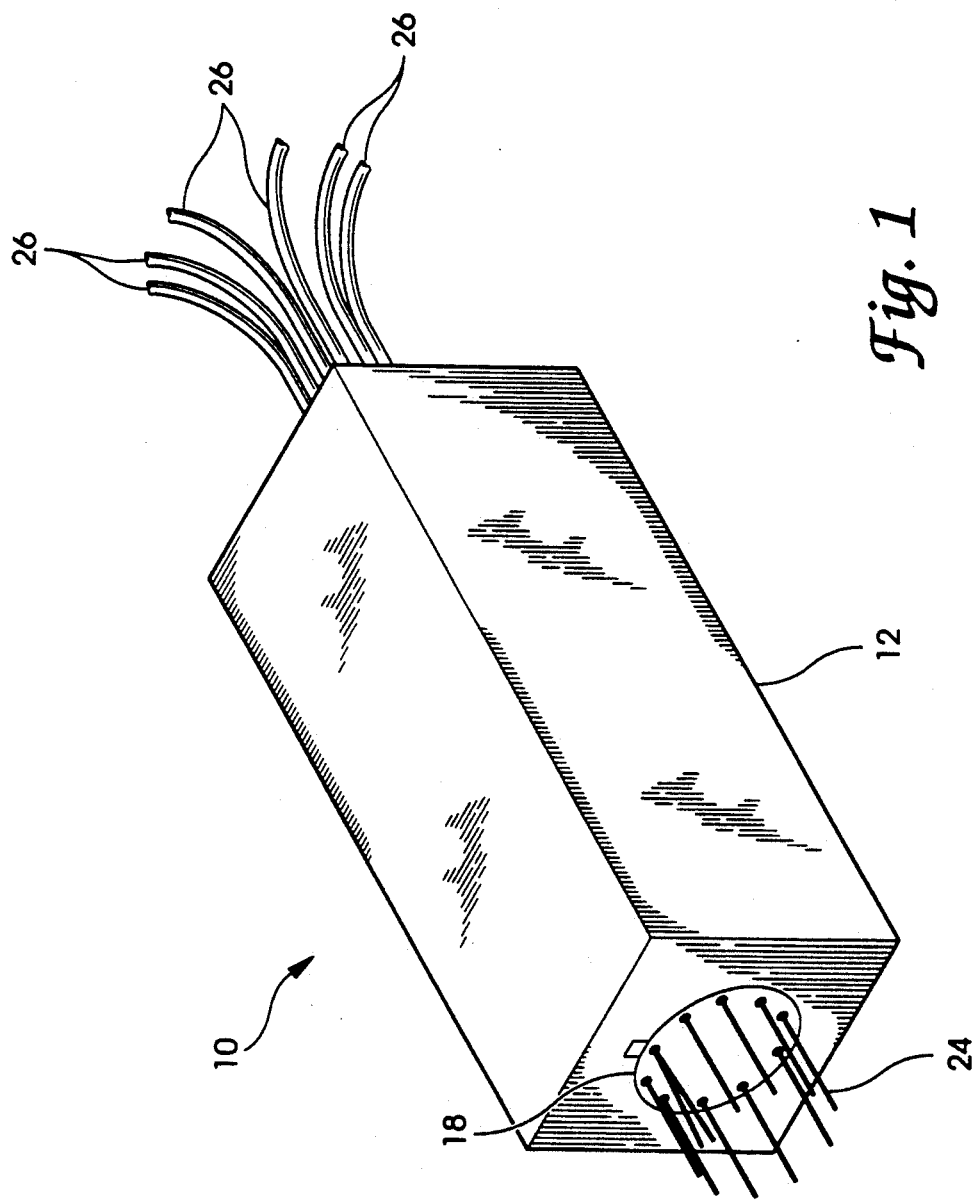
FIG. 1 is a perspective view of one embodiment of a light mixing device according to the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated devices, and such further applications of the principles of the invention as illustrated therein being contemplated as would normally occur to one skilled in the art to which the invention relates.

Figure 2:
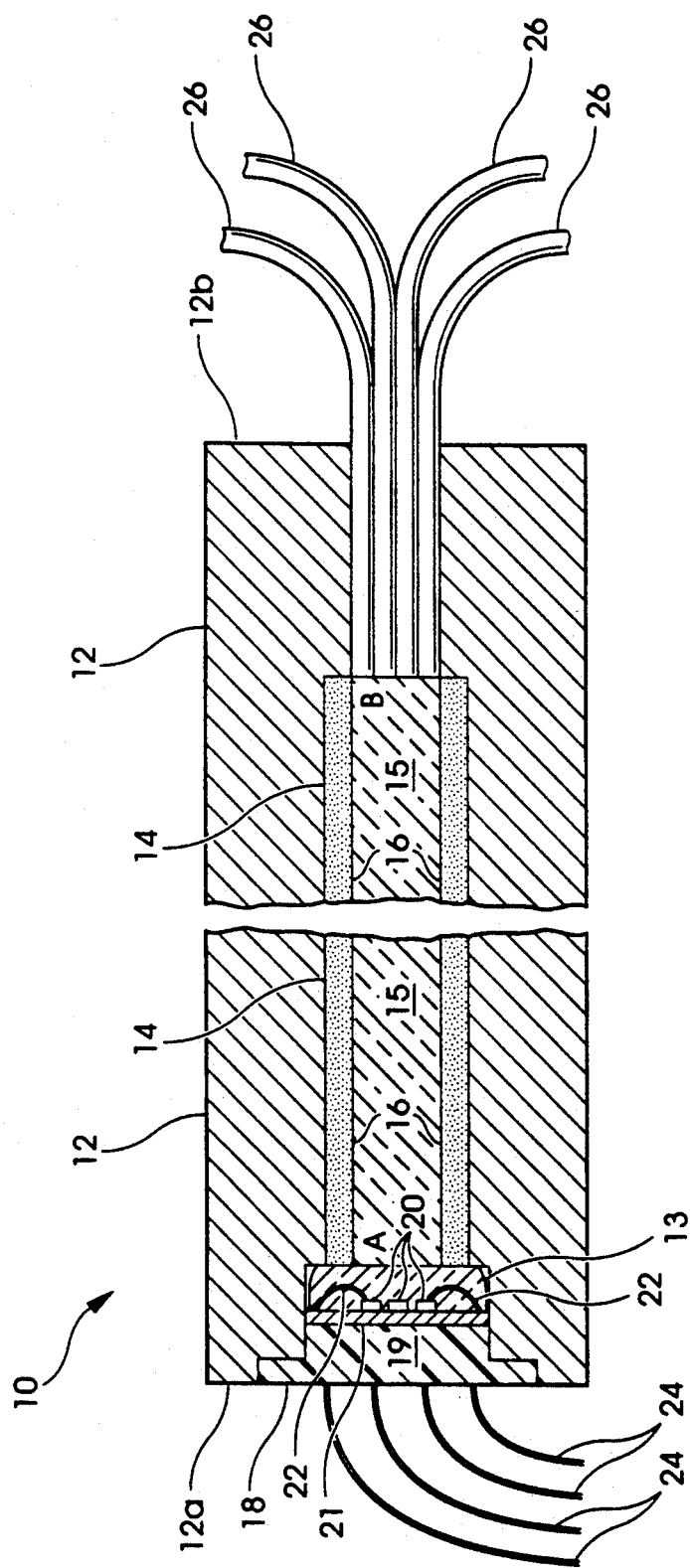
FIG. 2 is a segmented, central cross-section of the light mixing device of FIG. 1.
Figure 3:
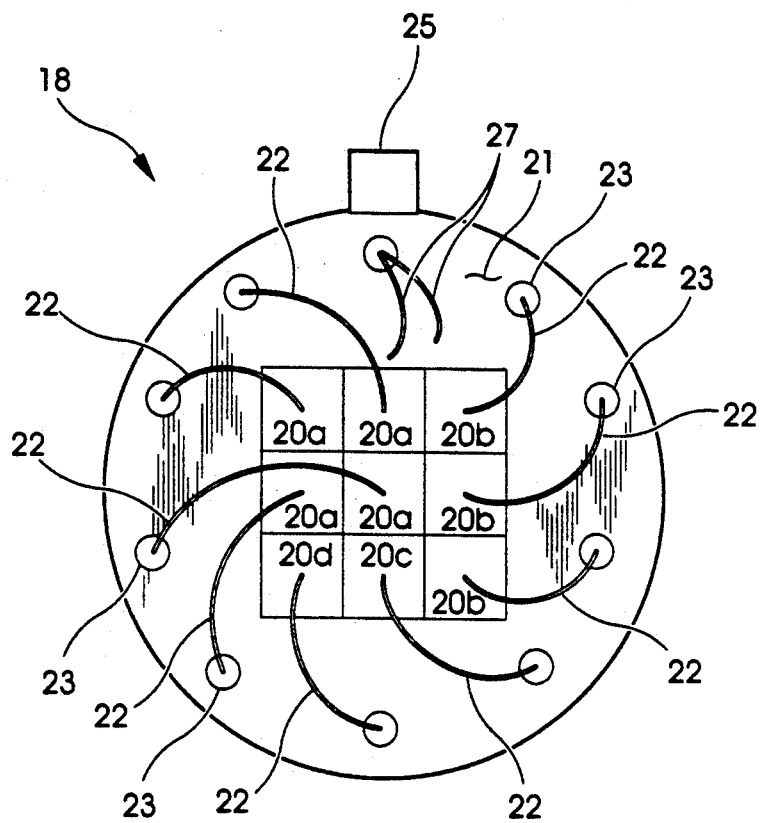
FIG. 3 is an end view of the LED assembly 18 of FIG. 1 depicting LED dies die bonded to an electronic header.

Referring now to FIGS. 1-3, a preferred embodiment of a light mixing device 10 with fiber optic outputs, or star coupler, according to the present invention is illustrated. Housing 12 has a hollow passage therethrough wherein various components are located. More particularly, a mixing rod 14, an LED assembly 18, optical fibers 26 and protective optical adhesive 13 are located therein. To assemble the device 10, mixing rod 14 is inserted into the passage of housing 12 at end 12a and LED assembly 18 is inserted adjacent the input aperture of mixing rod 14 and is attached to housing 12 by way of a suitable optical adhesive or mechanical attachment at location A. The passage within housing 12 is dimensioned to receive mixing rod 14 from end 12a only. At end 12b of housing 12, optical fibers 26 are inserted into the passage through housing 12 and abut the output aperture of mixing rod 14 at location B. A protective optical adhesive 13, such as Petrarch silicone PS2064, is applied over the inner area of LED assembly 18 to protect the wire bonds 22 and the LED dies 20a–d from damage. Additionally, the optical adhesive provides an optical coupling between the LED dies 20a–d and location A of mixing rod 14.

Mixing rod 14 is square or rectangular in cross-section and is preferably larger in cross-section than the LED array of LED assembly 18. Mixing rod 14 is constructed of two different glass or polymeric materials, the material used for core 15 has a higher index of refraction than the material used for the cladding 16. The inner portion of the mixing rod 14, called the core 15, optically transmits light from location A to location B of the core 15. The outer portion of the rod 14, called the cladding 16, causes light passing through the core 15 to be reflected from the core/cladding interface boundary. Such a structure is typical for a step index optical transmission device. What is a typical with respect to rod 14 is its square or rectangular cross-section, having relatively sharp corners. It is this cross-sectional shape and the relatively sharp corners thereof that cause light entering the rod at location A to be uniformly distributed by the time the light reaches location B, providing the length of rod 14 is at least 20 times its core width.

Referring to FIG. 3, LED assembly 18 includes an electronic header 21 to which multiple light generating devices or LED dies (or LEDs) 20a–d are die bonded. The spacing between the LED dies 20a–d is a very small distance, approximately 0.003 inches, and the LED die size is typically 0.020 inches on a side. The die bond between the LED dies 20a–d and the electronic header 21 provides an electrical and mechanical connection of the LED dies 20a–d to the header 21. Wire bonds 22 provide an electronic connection between conductors 24 (FIG. 2) and the LED dies 20a–d.

As shown in FIG. 3, the LED dies 20a, 20b, 20c and 20d are arranged in a three by three matrix arrangement and wire bonded with wire bonds 22 to wire bond pads 23. Pads 23 are electrically connected to conductors 24 and are electrically isolated from header 21. The letter subscript for the LED dies 20a–d provides an indication of the four different light wavelength LEDs that are illustrated in this particular configuration. Essentially, four type 20a LEDs, three type 20b LEDs, one type 20c LED and one type 20d LED are arranged in a three by three matrix. Additionally, wire bonds 27 provide a common ground return line via a connection to electronic header 21. Thus, current is supplied to any of the various LEDs 20a–d through wire bonds 22, and current returns through wire bonds 27, the common ground return signal path. Tab 25 provides a convenient mechanical locating device for correctly orienting the LED assembly 18. Header 21 is made of brass or other suitable material. Header 21 also absorbs thermal energy produced by the LEDs 20a–d and acts as a thermal conduit to facilitate the transfer of excess thermal energy to housing 12.

Operationally speaking, the LEDs 20a–d of the mixing device 10 have different central wavelengths of emitted light. Through appropriate electrical connections, it is possible to have one, several or all of the LED dies 20a–d illuminated at any one time. The LED dies 20a–d are butt coupled onto the mixing rod 14 and an optically clear, index matching optical adhesive 13, such as an optical silicone or epoxy, is placed between the LED dies 20a–d and the mixing rod 14. The index matching adhesive 13 provides two functions: (1) it causes the LED dies 20a–d to emit additional power into the acceptable forward angles, and (2) it reduces the lossy reflections associated with the entry point (location A) into the mixing rod 14. The output fibers 26 are placed in close proximity to location B of the mixing rod 14 and are bonded to the rod using the same (or a similar) optically clear adhesive as adhesive 13. Therefore, the structure acts as a wavelength division multiplexer in which light from multiple light sources of different wavelengths is combined in a highly efficient manner and is then split in a uniform fashion among a plurality of output fibers.

A typical application of the device 10 is in the field of spectroscopy. Light from one or more LED dies 20a–d is distributed through the device 10 to the output fibers 26 whose light bending characteristics provide convenient packaging to enable illumination of a target in a particular spectroscopic test device. For example, the absorption of a particular wavelength by oxygen in the blood can be measured, and secondary wavelengths can be utilized to calibrate the system during or before and after a primary light intensity measurement. It is also desirable that the LED array have multiple LED dies 20a–d of the same wavelength, thereby enabling spectral power balancing when the light emitted by one type of LED die is substantially fainter than that emitter by LED dies having a different wavelength of emitted light.

LED 20a, when activated, produces light at a particular intensity which is lower than that of the remaining LEDs, 20b, 20c, and 20d. Therefore, in order to achieve spectral uniformity among the different wavelengths of light produced by each of the four types of LEDs contained in the device 10, four of the LEDs 20a are required. Similarly, three of the LEDs 20b are required to produce the same light intensity in the spectral band of LED 20b to correspond with the intensity of light produced by LED 20c, and LED 20d. The ultimate objective, of course, is to produce light in four different spectral regions with spectral uniformity. In the alternative, if spectral flatness is not required, then nine different LEDs having nine different spectral responses may be used in the LED assembly 18. Increased light intensity in the spectral regions associated with each of the LEDs 20a–d enables a higher output signal from a photodetector as the light is directed toward and reflected from a target and detected by the photodiode or photodetector in a reflectance meter. A higher amplitude light signal received by the photodetector results in a higher amplitude output signal and is more easily analyzed, as well as having improved signal to noise characteristics. Thus, spectral uniformity and higher intensity light generating devices are desired attributes in a light mixing device used in a reflectance meter.

Figure 4:
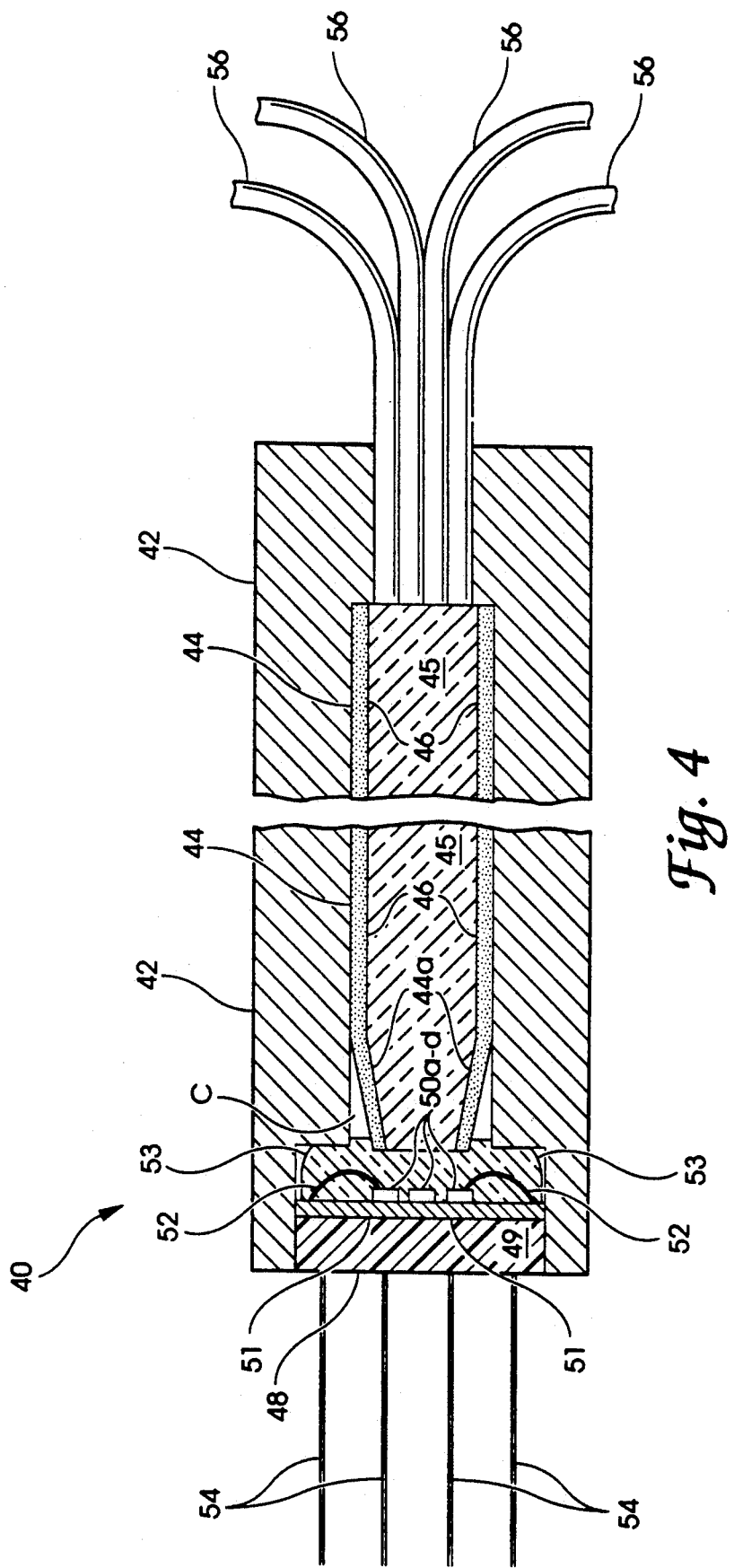
FIG. 4 is a segmented, central cross-section of an alternate embodiment of a light mixing device according to the present invention.

Referring now to FIG. 4, an alternate and equally preferred embodiment of a light mixing device 40 according to the present invention is shown. Light mixing device 40 includes substantially identical components as light mixing device 10 with the exception of the physical configuration of mixing rod 44. Device 40 includes a housing 42, rod 44, LED assembly 48, optical adhesive 53 and optical fibers 56. LED assembly 48 includes conductors 54, an array of LED dies 50a-d, wire bonds 52, electronic header 51 and nonconductive header 49. The assembly of mixing device 40 is identical with that of mixing device 10 in terms of the use of optical adhesive 53 to optically and mechanically connect fibers 56 to mixing rod 44 and LED assembly 48 to mixing rod 44, as well as mechanically connecting these components to housing 42.

Light mixing device 40 includes a mixing rod 44 having a taper at location 44a, which tapers to a minimum cross-section adjacent the illumination sources or LED dies 50a-d. LED dies 50a-d supply light to the input aperture of mixing rod 44. Additionally, the cladding 46 and core 45 both taper at location 44a. Light from the LED dies 50a-d can enter the rod 44 with a numerical aperture (NA, a unitless ratiometric value corresponding to the sine of the largest meridional ray angle which may be accepted by the light transmission fiber or light transmitting block) higher than can normally be accepted and will be transformed by the tapered geometry to light that has a lower numerical aperture (NA) to be transmitted by the fibers 56 at the output aperture or end of mixing rod 44. The physical geometry of mixing rod 44 enables light from a wider acceptance cone (higher NA) to enter the tapered end 44a of mixing rod 44, thereby increasing the amount of light accepted or received by mixing rod 44. The taper angle C is preferably greater than zero and less than or equal to twenty degrees. In all other respects, the device 40 is identical to the device 10 in functionality and component configuration.

In the preferred embodiments, materials for housings 12 and 42 are preferably an opaque material, and aluminium is a preferred material for the housings. Mixing rods 14 and 44 are constructed of G12 glass with the core having an index of refraction of 1.560 and the cladding an index of refraction of about 1.512. The mixing rods 14 and 44 are available from various custom glass drawing suppliers. Fibers 26 and 57 are available from Mitsubishi and other suppliers and are 0.50 mm base plastic fibers. Transparent epoxy (optical adhesive 13 and 53) used to mount or attach the fibers 56 to the mixing rod 44 and the housing 42 is available from Devcon Corporation of Danvers, Mass. The headers 19 and 49 are black epoxy casting resin (a nonconductive material) available from Emerson of Woburn, Mass. and Cumming of Woburn, Mass. The LED dies used in the LED assembly are available from Showa Dinko Corporation of Tokyo, Japan, and from Siemens Corporation of Santa Clara, Calif.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A fiber optic light mixing device comprising:
   a housing having a passage therethrough;
   a transparent mixing rod having a first end, a second end and having a rectangular cross-section, said rod having an inner core and an outer cladding wherein said core has a higher refractive index than the refractive index of said cladding, said rod situated within said passage, and said mixing rod having a length at least a predetermined multiple of its width;
   a plurality of LEDs attached to said housing and situated in close proximity to said first end of said rod, wherein said LEDs are mechanically and optically bonded to said first end of said mixing rod with an optical adhesive, said LEDs being arranged within an area equal to or smaller than the cross-sectional area of said first end of said rod, and said LEDs producing light in at least two spectrally distinct frequency bands, and wherein said LEDs are arranged in a matrix and wherein the cross-sectional area of said mixing rod adjacent said LEDs is larger in area than the area of said matrix; and
   a plurality of optical fibers attached to said housing and situated in close proximity to said second end of said rod, said fibers extending outward from said passage.

2. The device of claim 1 wherein said predetermined multiple is at least approximately eight.

3. The device of claim 2 wherein said optical fibers are mechanically and optically connected to said second end of said mixing rod with an optical adhesive.

4. The device of claim 2 wherein said housing is opaque, said mixing rod is made of a hard transparent material, and said LEDs produce light in the visible light range.

5. The device of claim 2 wherein said mixing rod includes a taper wherein said taper reduces the cross-sectional area of said mixing rod to a minimum adjacent said LEDs.

6. A fiber optic light mixing device comprising:
   a housing having a passage therethrough;
   light mixing means situated within said passage, said light mixing means including an input aperture, an output aperture, and a rectangular cross-section, wherein said light mixing means is an elongated transparent mixing rod having a rectangular cross-section and wherein said mixing rod includes a taper adjacent said input aperture which reduces the cross-sectional area of said light mixing means to a minimum at said input aperture to increase the numerical aperture of said light mixing means at said input aperture;
   multiple light signal producing means for producing light in at least two spectrally distinct frequency ranges, said multiple light signal producing means attached to said housing and situated in close proximity to said input aperture for supplying light into said input aperture; and
   a plurality of optical fibers attached to said housing and situated in close proximity to said output aperture.

7. The device of claim 6 wherein said multiple light signal producing means are attached to said mixing rod by an optical adhesive.

8. The device of claim 7 wherein said mixing rod includes an inner core and an outer cladding, and wherein said core has a higher refractive index than the refractive index of said cladding.

9. The device of claim 8 wherein said multiple light signal producing means are LEDs arranged in a matrix arrangement, and wherein said matrix arrangement is smaller in area than the area of said input aperture.

10. The device of claim 9 wherein each of said LEDs produces light in one of a plurality of predetermined wavelength ranges.

* * * * *